US012159271B2

(12) United States Patent
Cataldo et al.

(10) Patent No.: US 12,159,271 B2
(45) Date of Patent: Dec. 3, 2024

(54) VENDING SYSTEMS AND METHODS FOR ZERO EMISSIONS VEHICLES

(71) Applicant: NOW WE GO, CO., Westford, MA (US)

(72) Inventors: Jesse T. Cataldo, Westford, MA (US); Zac A. Cataldo, Westford, MA (US)

(73) Assignee: Now We Go, Co., Westford, MA (US)

( * ) Notice: Subject to any disclaimer, the term of this patent is extended or adjusted under 35 U.S.C. 154(b) by 0 days.

(21) Appl. No.: 17/672,465

(22) Filed: Feb. 15, 2022

(65) Prior Publication Data

US 2023/0186265 A1    Jun. 15, 2023

Related U.S. Application Data

(60) Provisional application No. 63/289,555, filed on Dec. 14, 2021.

(51) Int. Cl.

| | |
|---|---|
| *G06Q 20/18* | (2012.01) |
| *B60N 3/10* | (2006.01) |
| *G06Q 10/087* | (2023.01) |
| *G07F 9/00* | (2006.01) |
| *G07F 9/10* | (2006.01) |

(52) U.S. Cl.
CPC ............ *G06Q 20/18* (2013.01); *B60N 3/104* (2013.01); *G06Q 10/087* (2013.01); *G07F 9/001* (2020.05); *G07F 9/105* (2013.01)

(58) Field of Classification Search
CPC .......... G07F 9/026; G07F 9/001; G07F 9/105; G07F 9/009; F25D 3/08; G06Q 20/18; G06Q 10/087; G06Q 20/203; G06Q 30/06; G06Q 50/40; B60N 3/104
See application file for complete search history.

(56) References Cited

U.S. PATENT DOCUMENTS

| | | | |
|---|---|---|---|
| 3,172,713 A | 3/1965 | Rupert | |
| 6,234,345 B1 | 5/2001 | Minh et al. | |
| 10,124,708 B2 | 11/2018 | Dao et al. | |
| 10,793,044 B2 | 10/2020 | Dao et al. | |
| 10,803,688 B2 | 10/2020 | MeHale et al. | |

(Continued)

OTHER PUBLICATIONS

International Search Report and Written Opinion in International Application No. PCT/US2022/051638, mailed on Mar. 28, 2023, 14 pages.

*Primary Examiner* — Timothy R Waggoner
(74) *Attorney, Agent, or Firm* — Fish & Richardson P.C.

(57) ABSTRACT

A zero emissions, autonomous vehicle system includes a zero emissions, autonomous vehicle configured to navigate one or more roadways independently of a human driver and including an electrical power source electrically coupled to a motor of the vehicle; a passenger compartment within an interior volume of the vehicle and configured to support human passengers; and a vending system mounted at least partially in the interior volume and electrically coupled to the electrical power source. The vending system includes an accessible enclosure that includes at least one temperature-controlled compartment configured to store vending products; and a control system including a user interface and configured to operate the accessible enclosure to provide human access to the temperature-controlled compartment based on human interactions with the user interface.

35 Claims, 8 Drawing Sheets

(56) References Cited

U.S. PATENT DOCUMENTS

| | | |
|---|---|---|
| 10,853,862 B2 | 12/2020 | Baren et al. |
| 10,854,033 B2 | 12/2020 | Jafa et al. |
| 10,909,648 B2 | 2/2021 | Ibe |
| 11,359,848 B2 * | 6/2022 | Guan ...................... F25D 11/02 |
| 2004/0249502 A1 * | 12/2004 | Truong ................... G07F 13/10 |
| | | 700/232 |
| 2014/0316916 A1 * | 10/2014 | Hay ....................... G06Q 20/20 |
| | | 705/17 |
| 2014/0338390 A1 * | 11/2014 | Pinto ................... F25D 11/006 |
| | | 165/96 |
| 2015/0339928 A1 * | 11/2015 | Ramanujam ........... G08G 1/202 |
| | | 701/23 |
| 2017/0124547 A1 | 5/2017 | Natarajan et al. |
| 2019/0033856 A1 | 1/2019 | Ferguson et al. |
| 2019/0051083 A1 * | 2/2019 | Goldberg ................ G07F 9/026 |
| 2019/0205854 A1 * | 7/2019 | Baren ................. G06Q 20/322 |
| 2020/0273011 A1 * | 8/2020 | Winsor .................. G07F 9/002 |

* cited by examiner

VENDING SYSTEMS AND METHODS FOR ZERO EMISSIONS VEHICLES

CROSS-REFERENCE TO RELATED APPLICATION

This application claims priority under 35 U.S.C. § 119 to U.S. Provisional Patent Application Ser. No. 63/289,555, filed on Dec. 14, 2021, the entire contents of which are incorporated by reference herein.

TECHNICAL FIELD

The present disclosure relates to vending apparatus, systems, and methods for zero emissions vehicles.

BACKGROUND

Vending machines are well known in a variety of locations. Some are manual machines, while others are powered with electricity from wall outlets. There are vending machines on trains, in limousines, ships, schools, malls, ball parks, amphitheaters, and other places where people might purchase goods via impulse buying or due to necessity, such as water vending machines at a local park swimming pool.

SUMMARY

In an example implementation, a zero emissions, autonomous vehicle system includes a zero emissions, autonomous vehicle configured to navigate one or more roadways independently of a human driver, the zero emissions, autonomous vehicle including at least one electrical power source electrically coupled to a motor of the zero emissions, autonomous vehicle; a passenger compartment defined within an interior volume of the zero emissions, autonomous vehicle and configured to support one or more human passengers during the navigation of the one or more roadways independently of the human driver; and a vending system mounted at least partially in the interior volume of the zero emissions, autonomous vehicle and electrically coupled to the at least one electrical power source. The vending system includes an accessible enclosure that includes at least one temperature-controlled compartment configured to store one or more vending products; and a control system including a user interface, the control system configured to operate the accessible enclosure to provide human access to the at least one temperature-controlled compartment based on one or more human interactions with the user interface.

In an aspect combinable with the example implementation, the vending system further includes an air conditioning unit communicably coupled to the control system and configured to maintain the at least one temperature-controlled compartment at a specified temperature.

In another aspect combinable with any of the previous aspects, the at least one temperature-controlled compartment includes a first temperature-controlled compartment and a second temperature-controlled compartment, and the air conditioning unit is configured to maintain the first temperature-controlled compartment at a first specified temperature and to maintain the second temperature-controlled compartment at a second specified temperature higher than the first specified temperature.

In another aspect combinable with any of the previous aspects, the at least one temperature-controlled compartment includes a third temperature controlled compartment, and the air conditioning unit is configured to maintain the third temperature-controlled compartment at an ambient temperature substantially equal to a temperature of the interior volume of the zero emissions, autonomous vehicle.

In another aspect combinable with any of the previous aspects, the air conditioning unit includes a heat pump unit.

In another aspect combinable with any of the previous aspects, the accessible enclosure includes an accessible door for each of the first, second, and third temperature-controlled compartments.

In another aspect combinable with any of the previous aspects, the first temperature-controlled compartment includes a first sub-compartment and a second sub-compartment, each of the first and second sub-compartments including a refrigerated compartment.

In another aspect combinable with any of the previous aspects, the first sub-compartment includes a refrigerated compartment and the second sub-compartment includes a freezer compartment.

In another aspect combinable with any of the previous aspects, the control system is configured to perform operations including identifying a human interaction of the one or more human passengers with the user interface to select at least one of the vending products; identifying another human interaction of the one or more human passengers with the user interface to provide payment for the selected at least one of the vending products; and operating the accessible enclosure to open the at least one temperature-controlled compartment to provide access for the selected at least one of the vending products to the one or more human passengers.

In another aspect combinable with any of the previous aspects, the payment includes an electronic or digital payment.

In another aspect combinable with any of the previous aspects, the control system is configured to perform operations including visually identifying removal of the selected at least one of the vending products from the open at least one temperature-controlled compartment by the one or more human passengers; visually identifying removal of an unpaid for vending product in addition to the selected at least one of the vending products from the open at least one temperature-controlled compartment by the one or more human passengers; and notifying at least one of the one or more human passengers, an owner or operator of the vehicle, or a law enforcement system.

In another aspect combinable with any of the previous aspects, identifying the human interaction of the one or more human passengers with the user interface includes identifying a communication between a mobile device of the one or more human passengers and the user interface to select at least one of the vending products.

In another aspect combinable with any of the previous aspects, identifying another human interaction of the one or more human passengers with the user interface includes identifying another communication between the mobile device of the one or more human passengers to provide payment for the selected at least one of the vending products.

In another aspect combinable with any of the previous aspects, the control system is configured to perform operations including providing a notification of at least one of the selected at least one of the vending products or payment for the selected at least one of the vending products on the user interface.

In another aspect combinable with any of the previous aspects, the control system is configured to perform operations including providing a notification of at least one of the selected at least one of the vending products or payment for the selected at least one of the vending products to the mobile device.

In another aspect combinable with any of the previous aspects, the control system is configured to perform operations including determining, prior to operating the accessible enclosure to open the at least one temperature-controlled compartment, that the selected at least one of the vending products is an age-restricted vending product; and requesting, via the user interface, age confirmation from the one or more human passengers.

In another aspect combinable with any of the previous aspects, the control system is configured to perform operations including determining that the age confirmation meets or exceeds the age restriction; and subsequent to the determination, operating the accessible enclosure to open the at least one temperature-controlled compartment to provide access for the selected at least one of the vending products to the one or more human passengers.

In another aspect combinable with any of the previous aspects, the control system is configured to perform operations including determining that the age confirmation does not meet or exceed the age restriction; and subsequent to the determination, locking the at least one temperature-controlled compartment to prevent access to the selected at least one of the vending products to the one or more human passengers.

In another aspect combinable with any of the previous aspects, the selected at least one of the vending products includes an alcohol or tobacco product.

In another aspect combinable with any of the previous aspects, the control system is configured to perform operations including monitoring an inventory of the one or more vending products; and based on a dispensing of at least one of the one or more vending products to the one or more human passengers, adjusting the inventory of the one or more vending products.

In another aspect combinable with any of the previous aspects, the control system is configured to perform operations including storing payment transaction data and inventory data of the one or more vending products; and intermittently communicating the stored payment transaction data and inventory data wirelessly to a remote data store.

In another aspect combinable with any of the previous aspects, the zero emissions, autonomous vehicle includes a for-hire vehicle.

In another aspect combinable with any of the previous aspects, the one or more vending products includes a solid or liquid food product.

In another aspect combinable with any of the previous aspects, the solid or liquid food product includes a perishable food product.

In another example implementation, a method includes operating a zero emissions, autonomous vehicle to navigate one or more roadways independently of a human driver, the zero emissions, autonomous vehicle including at least one electrical power source electrically coupled to a motor of the zero emissions, autonomous vehicle; carrying one or more human passengers during the navigation of the one or more roadways independently of the human driver in a passenger compartment defined within an interior volume of the zero emissions, autonomous vehicle; operating a vending system mounted at least partially in the interior volume of the zero emissions, autonomous vehicle and electrically coupled to the at least one electrical power source. The operating includes storing one or more vending products in at least one temperature-controlled compartment of an accessible enclosure adjacent the one or more human passengers; and operating the accessible enclosure to provide human access to the at least one temperature-controlled compartment based on one or more human interactions with a user interface of a control system of the vending system.

An aspect combinable with the example implementation further includes maintaining the at least one temperature-controlled compartment at a specified temperature with an air conditioning unit communicably coupled to the control system of the vending system.

In another aspect combinable with any of the previous aspects, the at least one temperature-controlled compartment includes a first temperature-controlled compartment and a second temperature-controlled compartment.

Another aspect combinable with any of the previous aspects further includes maintaining, with the air conditioning unit, the first temperature-controlled compartment at a first specified temperature; and maintaining, with the air conditioning unit, the second temperature-controlled compartment at a second specified temperature higher than the first specified temperature.

In another aspect combinable with any of the previous aspects, the at least one temperature-controlled compartment includes a third temperature controlled compartment.

Another aspect combinable with any of the previous aspects further includes maintaining, with the air conditioning unit, the third temperature-controlled compartment at an ambient temperature substantially equal to a temperature of the interior volume of the zero emissions, autonomous vehicle.

In another aspect combinable with any of the previous aspects, the air conditioning unit includes a heat pump unit.

Another aspect combinable with any of the previous aspects further includes operating, with the control system, an access door for each of the first, second, and third temperature-controlled compartments.

In another aspect combinable with any of the previous aspects, the first temperature-controlled compartment includes a first sub-compartment and a second sub-compartment, each of the first and second sub-compartments including a refrigerated compartment.

In another aspect combinable with any of the previous aspects, the first sub-compartment includes a refrigerated compartment and the second sub-compartment includes a freezer compartment.

Another aspect combinable with any of the previous aspects further includes identifying, with the control system, a human interaction of the one or more human passengers with the user interface to select at least one of the vending products; identifying, with the control system, another human interaction of the one or more human passengers with the user interface to provide payment for the selected vending product; and operating, with the control system, the accessible enclosure to open the at least one temperature-controlled compartment to provide access for the selected vending product to the one or more human passengers.

In another aspect combinable with any of the previous aspects, the payment includes an electronic or digital payment.

Another aspect combinable with any of the previous aspects further includes visually identifying, with the control system, removal of the selected vending product from the open at least one temperature-controlled compartment by the one or more human passengers; visually identifying, with the control system, removal of an unpaid for vending product in addition to the selected vending product from the open at least one temperature-controlled compartment by the one or more human passengers; and notifying, with the control system, at least one of the one or more human passengers, an owner or operator of the vehicle, or a law enforcement system.

In another aspect combinable with any of the previous aspects, identifying the human interaction of the one or more human passengers with the user interface includes identifying, with the control system, a communication between a mobile device of the one or more human passengers and the user interface to select at least one of the vending products.

In another aspect combinable with any of the previous aspects, identifying another human interaction of the one or more human passengers with the user interface includes identifying, with the control system, another communication between the mobile device of the one or more human passengers to provide payment for the selected vending product.

Another aspect combinable with any of the previous aspects further includes providing, with the control system, a notification of at least one of the selected vending product or payment for the selected vending product on the user interface.

Another aspect combinable with any of the previous aspects further includes providing, with the control system, a notification of at least one of the selected vending product or payment for the selected vending product to the mobile device.

Another aspect combinable with any of the previous aspects further includes determining, with the control system and prior to operating the accessible enclosure to open the at least one temperature-controlled compartment, that the selected vending product is an age-restricted vending product; and requesting, with the control system and via the user interface, age confirmation from the one or more human passengers.

Another aspect combinable with any of the previous aspects further includes determining, with the control system, that the age confirmation meets or exceeds the age restriction; and subsequent to the determination, operating, with the control system, the accessible enclosure to open the at least one temperature-controlled compartment to provide access for the selected at least one of the vending products to the one or more human passengers.

Another aspect combinable with any of the previous aspects further includes determining, with the control system, that the age confirmation does not meet or exceed the age restriction; and subsequent to the determination, locking, with the control system, the at least one temperature-controlled compartment to prevent access to the selected at least one of the vending products to the one or more human passengers.

In another aspect combinable with any of the previous aspects, the selected at least one of the vending products includes an alcohol or tobacco product.

Another aspect combinable with any of the previous aspects further includes monitoring, with the control system, an inventory of the one or more vending products; and based on a dispensing of at least one of the one or more vending products to the one or more human passengers, adjusting, with the control system, the inventory of the one or more vending products.

Another aspect combinable with any of the previous aspects further includes storing, with the control system, payment transaction data and inventory data of the one or more vending products; and intermittently communicating, with the control system, the stored payment transaction data and inventory data wirelessly to a remote data store.

In another aspect combinable with any of the previous aspects, operating the zero emissions, autonomous vehicle includes operating the zero emissions, autonomous vehicle as a for-hire vehicle.

In another aspect combinable with any of the previous aspects, the one or more vending products includes a solid or liquid food product.

In another aspect combinable with any of the previous aspects, the solid or liquid food product includes a perishable food product.

In another example implementation, a vending system for a zero emissions, autonomous vehicle configured to navigate one or more roadways independently of a human driver with at least one electrical power source electrically coupled to a motor of the zero emissions, autonomous vehicle and a passenger compartment defined within an interior volume of the zero emissions, autonomous vehicle and configured to support one or more human passengers during the navigation of the one or more roadways independently of the human driver includes an accessible enclosure that includes at least one temperature-controlled compartment configured to store one or more vending products; and a control system electrically coupled to the at least one electrical power source and including a user interface, the control system configured to operate the accessible enclosure to provide human access to the at least one temperature-controlled compartment based on one or more human interactions with the user interface.

An aspect combinable with the example implementation further includes an air conditioning unit communicably coupled to the control system and configured to maintain the at least one temperature-controlled compartment at a specified temperature.

In another aspect combinable with any of the previous aspects, the at least one temperature-controlled compartment includes a first temperature-controlled compartment and a second temperature-controlled compartment, and the air conditioning unit is configured to maintain the first temperature-controlled compartment at a first specified temperature and to maintain the second temperature-controlled compartment at a second specified temperature higher than the first specified temperature.

In another aspect combinable with any of the previous aspects, the at least one temperature-controlled compartment includes a third temperature controlled compartment, and the air conditioning unit is configured to maintain the third temperature-controlled compartment at an ambient temperature substantially equal to a temperature of the interior volume of the zero emissions, autonomous vehicle.

In another aspect combinable with any of the previous aspects, the air conditioning unit includes a heat pump unit.

In another aspect combinable with any of the previous aspects, the accessible enclosure includes an accessible door for each of the first, second, and third temperature-controlled compartments.

In another aspect combinable with any of the previous aspects, the first temperature-controlled compartment includes a first sub-compartment and a second sub-compartment, each of the first and second sub-compartments including a refrigerated compartment.

In another aspect combinable with any of the previous aspects, the first sub-compartment includes a refrigerated compartment and the second sub-compartment includes a freezer compartment.

In another aspect combinable with any of the previous aspects, the control system is configured to perform operations including identifying a human interaction of the one or more human passengers with the user interface to select at least one of the vending products; identifying another human interaction of the one or more human passengers with the user interface to provide payment for the selected at least one of the vending products; and operating the accessible enclosure to open the at least one temperature-controlled compartment to provide access for the selected at least one of the vending products to the one or more human passengers.

In another aspect combinable with any of the previous aspects, the payment includes an electronic or digital payment.

In another aspect combinable with any of the previous aspects, the control system is configured to perform operations including visually identifying removal of the selected at least one of the vending products from the open at least one temperature-controlled compartment by the one or more human passengers; visually identifying removal of an unpaid for vending product in addition to the selected at least one of the vending products from the open at least one temperature-controlled compartment by the one or more human passengers; and notifying at least one of the one or more human passengers, an owner or operator of the vehicle, or a law enforcement system.

In another aspect combinable with any of the previous aspects, identifying the human interaction of the one or more human passengers with the user interface includes identifying a communication between a mobile device of the one or more human passengers and the user interface to select at least one of the vending products.

In another aspect combinable with any of the previous aspects, identifying another human interaction of the one or more human passengers with the user interface includes identifying another communication between the mobile device of the one or more human passengers to provide payment for the selected at least one of the vending products.

In another aspect combinable with any of the previous aspects, the control system is configured to perform operations including providing a notification of at least one of the selected at least one of the vending products or payment for the selected at least one of the vending products on the user interface.

In another aspect combinable with any of the previous aspects, the control system is configured to perform operations including providing a notification of at least one of the selected at least one of the vending products or payment for the selected at least one of the vending products to the mobile device.

In another aspect combinable with any of the previous aspects, the control system is configured to perform operations including determining, prior to operating the accessible enclosure to open the at least one temperature-controlled compartment, that the selected at least one of the vending products is an age-restricted vending product; and requesting, via the user interface, age confirmation from the one or more human passengers.

In another aspect combinable with any of the previous aspects, the control system is configured to perform operations including determining that the age confirmation meets or exceeds the age restriction; and subsequent to the determination, operating the accessible enclosure to open the at least one temperature-controlled compartment to provide access for the selected at least one of the vending products to the one or more human passengers.

In another aspect combinable with any of the previous aspects, the control system is configured to perform operations including determining that the age confirmation does not meet or exceed the age restriction; and subsequent to the determination, locking the at least one temperature-controlled compartment to prevent access to the selected at least one of the vending products to the one or more human passengers.

In another aspect combinable with any of the previous aspects, the selected at least one of the vending products includes an alcohol or tobacco product.

In another aspect combinable with any of the previous aspects, the control system is configured to perform operations including monitoring an inventory of the one or more vending products; and based on a dispensing of at least one of the one or more vending products to the one or more human passengers, adjusting the inventory of the one or more vending products.

In another aspect combinable with any of the previous aspects, the control system is configured to perform operations including storing payment transaction data and inventory data of the one or more vending products; and intermittently communicating the stored payment transaction data and inventory data wirelessly to a remote data store.

In another aspect combinable with any of the previous aspects, the zero emissions, autonomous vehicle includes a for-hire vehicle.

In another aspect combinable with any of the previous aspects, the one or more vending products includes a solid or liquid food product.

In another aspect combinable with any of the previous aspects, the solid or liquid food product includes a perishable food product.

Implementations according to the present disclosure may include one or more of the following features. For example, implementations of a vending system can use power from an EV traction battery for continuous operation. Thus, the EV traction battery can provide power to the vending system to provide customers with hot food items (e.g., hot dogs, hot coffee, hot sandwiches, per-packaged meals, etc.), warm food items (e.g., warm muffins, pastries, pizza slices, etc.), vehicle temperature (66-78° Fahrenheit) items (e.g., first aid, books, magazines, tobacco, snacks, battery banks/cell phone chargers), cool refrigerated food items (e.g., water, drinks, fruit, desserts like cakes, cold deli sandwiches, hummus with crackers, yogurt, alcoholic beverages, etc.), frozen food items (e.g., prepackaged ice cream goods, alcoholic beverages like ice cold beer and frozen drinks, ice packs for injuries, etc.). As another example, implementations of a vending system with heated and refrigerated storage compartments can allow customers to order items from grocery stores, restaurants and other retail stores using a mobile phone app that will be delivered to the customer via the autonomous vehicle at a convenient time and place. By using disclosed vending machine security features, other items can be in the vending system that the customer did not necessarily order and still the customer can retrieve the items they ordered without the fear of them "stealing" other vending items they have not paid for.

As another example, implementations of a vending system can include special lockable partitions in the compartments that can store non-vending items. These partitions can use switchable smart glass to hide the contents of these partitioned segments when items are not for sale and being transported to customers directly. The smart glass can switch to clear when the vending machine arrives at the appropriate customer's location so they can see and retrieve their items. Such locked partitions can also be used to vend age restricted/sensitive items (e.g. alcohol, tobacco, feminine hygiene products, condoms, adult items, etc.). The smart glass can display or not display items when appropriate and the lockable door to the partition can dispense items only when appropriate.

As another example, implementations of a vending system can act as a mobile vending machine for public events by arriving where they are needed. The autonomous vehicle can be rented by customers who want to sell certain items at events, for instance a customer could "rent out" the vending machine to sell band merchandise and drinks at a concert venue so that when concert goers arrive or leave the venue, they can buy band merchandise and drinks from our vending machine parked outside (or inside) the venue without emitting harmful gasses or noise while parked (e.g., in a lobby of the venue). The owner of the vehicle/vending machine could also park in public areas and offer the same vending services. For example it could act as a mobile food truck.

As a further example, implementations of a vending system can include a mobile application so that customers can browse vendable items from one or more autonomous vehicles and request certain items be delivered to their location, thus summoning the vehicle and allowing a vending transaction without the need for the customer to travel.

As another example, implementations of a vending system for an autonomous vehicle, unlike traditional vending machines, allows for repeated re-stocking during the day by having the autonomous vehicle travel to strategic depot/warehouses that are scheduled efficiently into its routes. This allows for a more economical and efficient use of vending space and re-stocking labor, thereby lowering the cost of vendable items and overhead and increasing potential sales. Examples would be the ability to have more hot coffee and scones available in the morning, heartier food items at lunch time, and more alcohol and dessert items in the evening/night.

As another example, implementations of a vending system can collect (with a user's permission) data from customers about times, locations, customer personal info, weather, etc. to make predictive models for stocking, pricing, smell emitting and advertising thereby increasing sales.

As a further example, implementations of a vending system can offer the ability to advertise to customers both in the autonomous vehicle and customers not in the autonomous vehicle using both a visual device (e.g., screen) and a mobile phone app. For example, a potential customer on the route the autonomous car is taking to pick up a customer could receive a notification from our vending machine app telling them about a special on pizza slices at lunch time. The customer could then request the autonomous vehicle to stop on its way and sell that item (and/or additional items), thereby increasing efficiency and sales.

As another example, implementations of a vending system can advertise to riders for other businesses that want to pay for on-screen advertising using our data collected. This on-screen ad could have a button that would re-route the vehicle to that business and communicate with that business that the customer is on the way so that a reservation or other transaction could be made. (Example: a rider on a longer trip sees that a Thai restaurant is on the way and they can book a table and even pre-order their meal. Then the vehicle drops them off at the restaurant.)

As another example, implementations of a vending system can deliver medicine safely, quickly and securely to customers. Example: a customer orders prescription medicine from a pharmacy that is temperature sensitive. The autonomous vehicle picks it up at the pharmacy and delivers it in the special, lockable partition and can even change the temperature of that compartment to what is exactly required to keep the medicine safe.

As another example, implementations of a vending system can provide the ability for customers to send items to other people in town. For example: Sally forgot to give her brother the keys to her house before she went to the airport. So at the airport, she calls for an autonomous vehicle with a vending system to bring her keys to her brother's work using compartments.

As another example, implementations of a vending system can store items for riders at different temperatures. For example: a rider wants to bring an ice cream cake to a birthday party. The vending system can hold that item for them until they arrive without it melting.

As another example, implementations of a vending system can include cameras built in that can also record the vehicle's passenger compartment, the autonomous vehicle's passenger compartment can act as a "storage locker" so that customers can courier larger packages than our vending machine can hold. For example: a customer buys a vacuum cleaner at a department store and wants it delivered to their significant other while they head further into town for a party.

As another example, implementations of a vending system can offer the lack of human labor to make almost any service cheaper. Being cheaper opens up many new potential opportunities for business ideas that would been prohibitively expensive without this technology.

As another example, implementations of a vending system can allow for the use of human labor in a much more efficient way than ever before. Having a human laborer be ferried around a residential neighborhood by autonomous vehicles keeps the human laborer in the area where his labor is needed versus constantly traveling to and from industrial to residential areas. Example: A couple buys a blender at a mall. They send the blender home in an autonomous EV vending system but normally no one would be at their house to bring it to their doorstep. And it would be too expensive to add the human labor for the entire drive from the mall to their house. But having a human laborer who gets ferried around their neighborhood in a separate autonomous vehicle controlled by the app means that his time and labor is only needed for a few minutes as opposed to hours.

The details of one or more implementations of the subject matter described in this disclosure are set forth in the accompanying drawings and the description. Other features, aspects, and advantages of the subject matter will become apparent from the description, the drawings, and the claims.

DETAILED DESCRIPTION

Figure 1A:
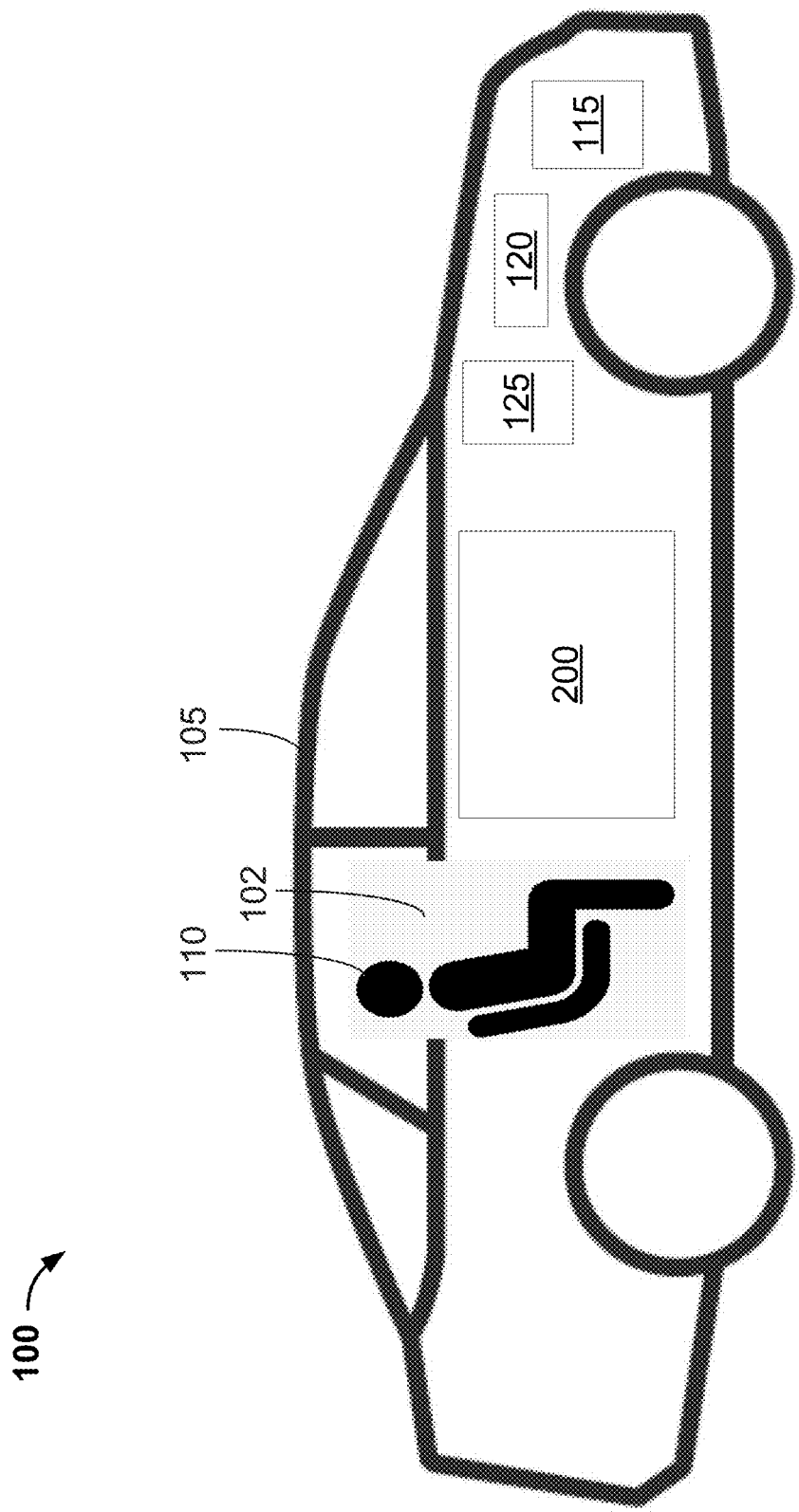
FIGS. 1A-1B are schematic illustrations of an example implementation of a zero-emissions, autonomous vehicle that includes a vending system according to the present disclosure.
Figure 1B:
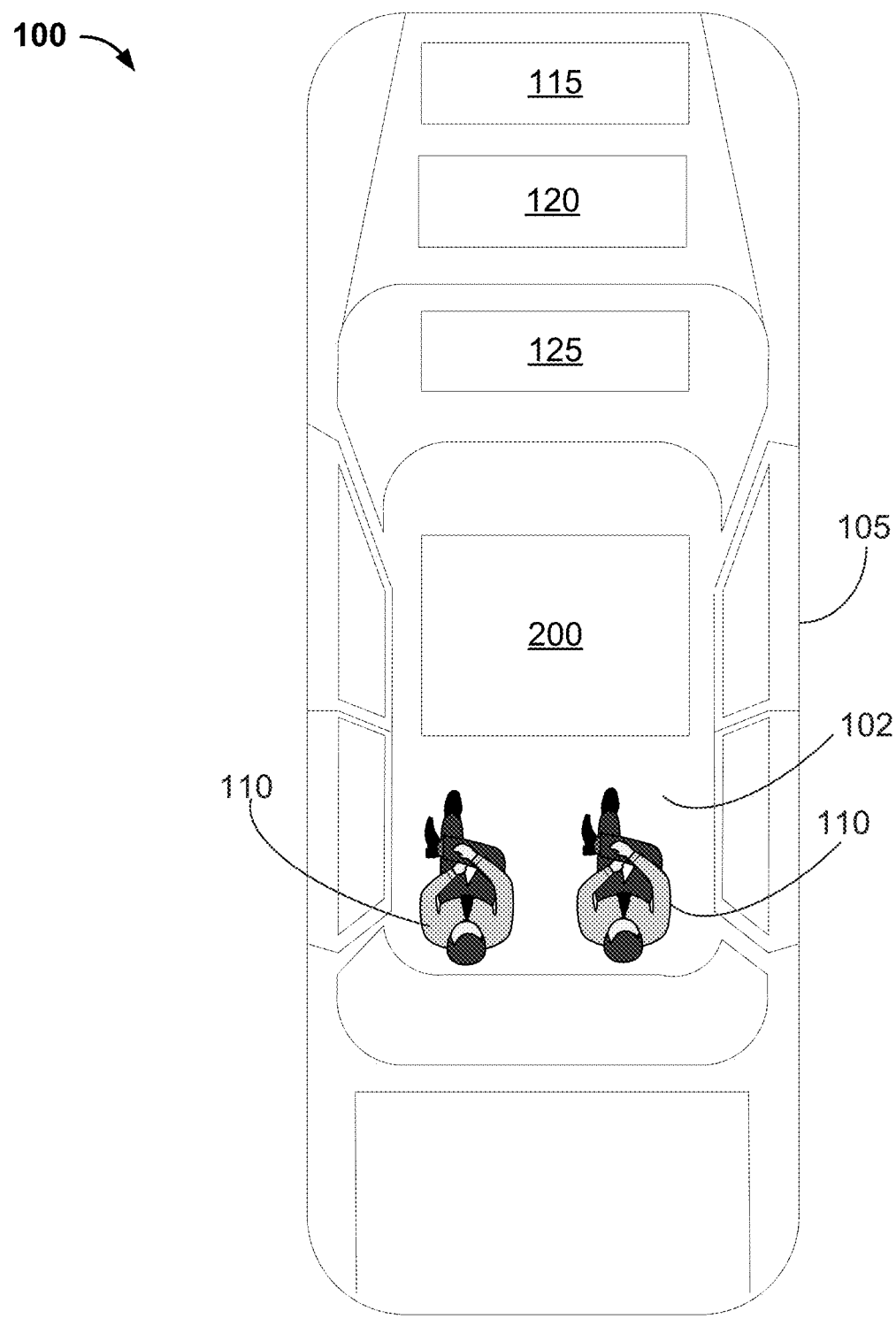

FIGS. 1A-1B are schematic illustrations of an example implementation of a zero-emissions, autonomous vehicle ("vehicle") 100 that includes a vending system 200 according to the present disclosure. As shown, vehicle 100 is a driverless, zero-emissions, autonomous vehicle that can carry one or more human passengers 110 in a passenger space 102 (that can include, for example, a back seating area, a front seating area, as well as other seating areas of the vehicle 100) defined by a frame (or chassis) 105 of the vehicle 100. In this example, the vehicle 100 is shown as a sedan, but other implementations contemplated by the present disclosure can be an SUV, truck, coup, van, or other vehicle that can carry one or more human passengers 110. In some examples, the vehicle 100 comprises a for-hire vehicle, such as a taxi or other vehicle in which an owner of the vehicle may not be one of the one or more human passengers 110, and the one or more human passengers 110 are paying a fare for use of the vehicle 100.

In this example, the vehicle 100 is an electric vehicle (EV) that includes one or more electric motors 115 that provide motive power to one or more wheels of the vehicle 100. The electric motor 115 is electrically coupled to one or more electrical power sources 120 (such as batteries or other independent power sources). For example, in some aspects, the one or more electrical power sources 120 can provide electrical power to the electric motor 115, as well as other components of the vehicle 100, including the vending system 200 (during autonomous driving operation of the vehicle 100 or non-driving operation of the vehicle 100).

The vehicle 100 also includes an autonomous driving control system 125 that is operable to autonomously (in other words, independently of a human driver) navigate and move the vehicle 100 on and along roadways to move the one or more human passengers 110 between locations. Generally, the vehicle 100 can be a fully autonomous vehicle that determines and executes fully-autonomous driving decisions in order to navigate through an environment (e.g., a Level 2 through Level 5 automated vehicle according to the Society of Automotive Engineers (SAE)). The operational navigations and decisions for the vehicle 100 can be performed by the autonomous driving control system 125. In some aspects, the autonomous driving control system 125 includes one or more driving sensors that, in this example implementation, provide for a combination of components that receive reflections of electromagnetic radiation, e.g., lidar systems that detect reflections of laser light, radar systems that detect reflections of radio waves, and camera systems that detect reflections of visible light. The sensor data generated by a given sensor generally indicates a distance, a direction, or an intensity of reflected radiation (or a combination thereof). For example, a sensor can transmit one or more pulses of electromagnetic radiation in a particular direction and can measure the intensity of any reflections as well as the time that the reflection was received. A distance can be computed by determining how long it took between a pulse and its corresponding reflection. The sensor can continually sweep a particular space in angle, azimuth, or both. Sweeping in azimuth, for example, can allow a sensor to detect multiple objects along the same line of sight. Thus, in some aspects, the one or more sensors may provide data that indicates a distance between the vehicle 100 and another object (e.g., a vehicle or otherwise) adjacent the vehicle 100. The provided data can be communicated by the autonomous driving control system 125 to the navigation and driving systems of the vehicle 100, such as the electric motor 115, braking systems, GPS systems, and other components of the vehicle 100 in order to autonomously navigate and drive the vehicle 100 from a particular location to another pre-specified location.

As shown in this example, at least a portion of the vending system 200 can be positioned in the passenger space 102 and adjacent the human passenger(s) 110. Generally, vending system 200 is electrically coupled to the electric power source 120 (directly or indirectly) so that electrical power is available and usable to the vending system 200 at all times (when the vehicle 100 is driving, when the vehicle 100 is parked, and when the vehicle 100 is "off").

Indeed, because of the autonomous nature of vehicle 100, as well as its potential use as a vehicle for hire (e.g., a "robotaxi"), the vehicle 100 can ferry one or more people 110 from one location to another, without a driver in the vehicle. The lack of a driver within the vehicle 100 can present one or more security issues for vending systems that are unique to driver-less vehicles that are resolved by vending system 200. These issues include having the passenger space 102 of the vehicle 100 occupied only by passengers 110, without a driver/supervisor. And while some robotaxis may include a camera to monitor the goings on within a vehicle, this supervision is directed toward protecting the vehicle, and not a vending machine installed within the vehicle. Vending system 200, however, can provide independent supervision of one or more vending products therein as further explained in the present disclosure.

As an electrically-powered vending machine, vending system 200 must use a source of electrical energy to operate to dispense one or more vending products within the vehicle 100. In some aspects, the vending system 200 can include its own, independent power source (e.g., one or more batteries) to power the vending system 200. As noted, in some aspects, the vending system 200 is electrically coupled through such independent power source to the electric power source 120 (i.e., the vehicle traction battery), which can have a 50 kWh to 100 kWh energy capacity for autonomously driving the vehicle 100.

Unlike an internal combustion engine (ICE) based vehicle (e.g., a conventional taxi or ride-share), even if fully autonomously controlled, having a supply of on demand energy can enable new features to be included in the vending system 200 typically intended for use within a robotaxi when the vehicle 100 is an EV. The large traction battery of the vehicle 100 can enable the inclusion of new features within an autonomously powered vending machine such as vending system 200, whether the machine is installed within an EV robotaxi using the traction battery as the energy source, or at a remote location where an internal battery of the vending system 200 provides the energy for independent operation of the vending system 200.

In some aspects, the vending system 200 can be configured as an energy independent vending machine, e.g., set up at a special event without electrical power outlets. Such a machine might only need to operate for one or a few days, independently. The vending system 200 can operate for a required time period (within or independent of the vehicle 100) and then be recovered and brought back for charging overnight. Such a version of the vending system 200 can be operated at a location or an event by day, and then be charged and re-stocked by night. Rather than a simple manual vending machine, the addition of an independent power source can enable the vending system 200 to be autonomously driven to a location and placed irrespective of whether power is available.

In addition, a typical vending machine may use from 10 W to 300 W of continuous power equivalent or more. The power required depends upon the systems that require power. Further, some systems may require power at intermittent times so that a system that requires 1 kW of power for short periods might actually only have an equivalent continuous power of 50 W if the duty cycle is ½0th of full time. In some aspects, the vending system 200 can include an independent power source such as a 1 kWh battery, which may last multiple days before needing to be recharged. Alternately, for vending machines receiving energy to operate from an EV traction battery, the effectively low "continuous" power consumption means the vending system 200 may not deplete the vehicle traction battery in an unreasonably short period of time.

Figure 2:
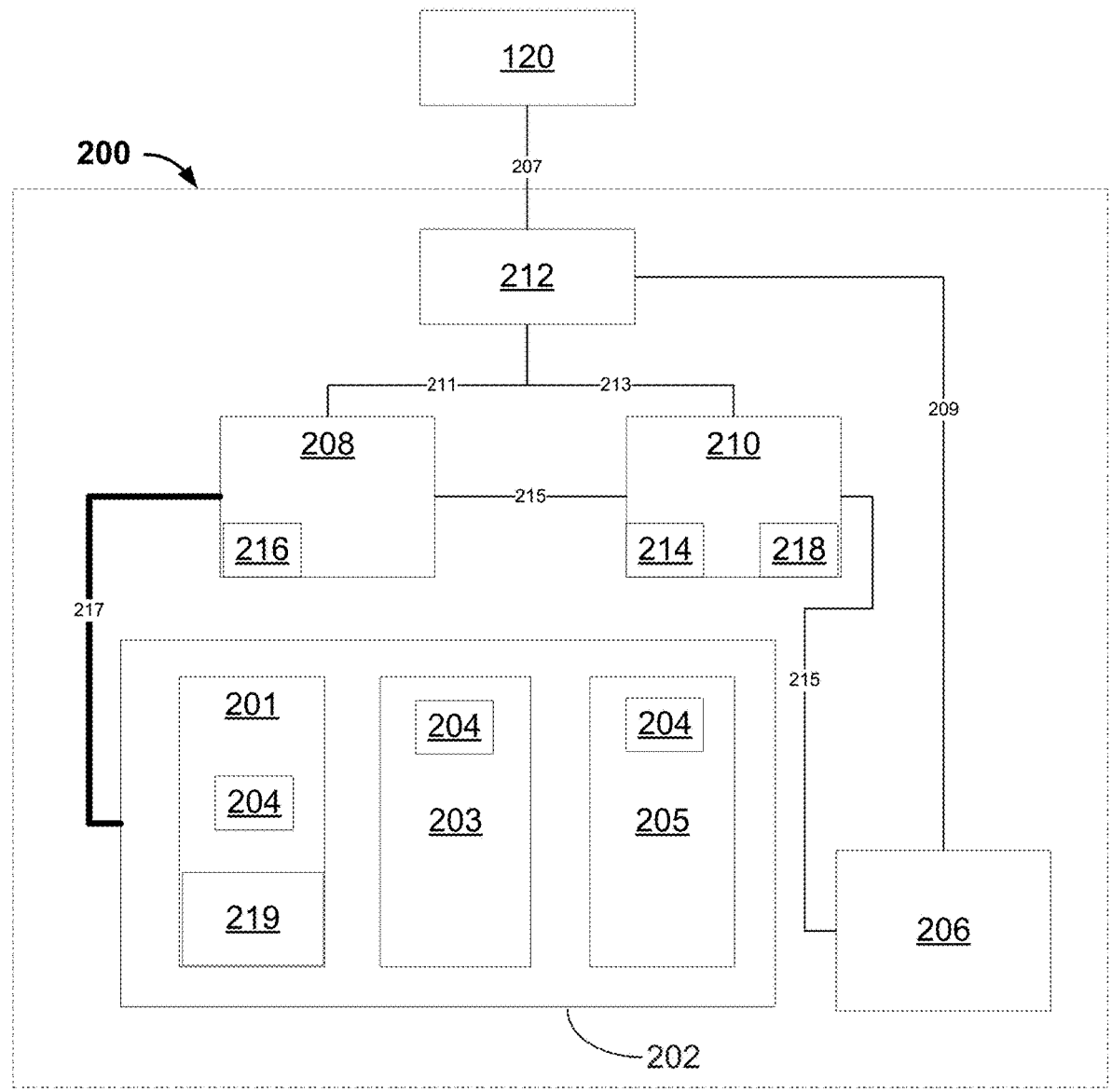
FIG. 2 is a schematic illustration of a vending system for a zero-emissions, autonomous vehicle according to the present disclosure.

FIG. 2 is a schematic illustration of the vending system 200 for the zero-emissions, autonomous vehicle 100 according to the present disclosure. In this example implementation, the vending system 200 includes an enclosure 202 to hold vending products 204 within one or more temperature-controlled compartments 201, 203, and 205. In some aspects, the enclosure 202 comprises an insulated enclosure and/or one or more of the temperature-controlled compartments 201, 203, and 205 comprise insulated enclosures to store the vending products 204 at particular, maintained temperatures. In some aspects, one or more vending products 204 is a perishable item, such as a perishable food or drink item. In some aspects, one or more vending products 204 is an item (such as a food or drink) which is required to be kept at a refrigerated temperature (e.g., 38-40° F.) while another of the vending products 204 is an item (such as a food or drink) which is required to be kept at a frozen temperature (e.g., 32° F. or less). In some aspects, one or more of the vending products 204 is an item (such as a food or drink) that is required to be kept at a heated temperature (e.g., above 100° F.). In some aspects, one or more of the vending products 204 is an item that can be kept at an ambient temperature (such as the ambient temperature of passenger space 102).

In this example implementation, there are three temperature-controlled compartments 201, 203, and 205. For example, temperature-controlled compartment 201 can be a cooled compartment 201, temperature-controlled compartment 203 can be a heated compartment 203, and temperature-controlled compartment 205 can be an ambient temperature compartment 205. In some aspects, as shown, cooled compartment 201 can include a freezer compartment 219 (while the remaining portion of the cooled compartment 201 can be a refrigerated space.

As shown in this example, the vending system 200 also includes an air conditioning system 208, which, in some aspects, can be a heat pump (with or without electric heat or other heat) that can supply one or more conditioned fluids 217 (such as a cooled airflow, a heated airflow, a dehumidified airflow, or conditioned flows of a liquid) to the enclosure 202. In some aspects, the one or more conditioned fluids 217 provided by the air conditioning system 208 can maintain each particular temperature-controlled compartment 201, 203, and 205 at a specified temperature unique to that temperature-controlled compartment (relative to the other temperature-controlled compartments). As shown in this example, a thermostat 216 can be connected to or part of the air conditioning system 208 in order to operate the air conditioning system 208 to supply the one or more conditioned fluids 217 to maintain each particular temperature-controlled compartment 201, 203, and 205 at the unique, specified temperature unique to that temperature-controlled compartment.

In some aspects, ambient temperature compartment 205 can be maintained (e.g., through operation of the air conditioning system 208) at a particular temperature that can be, for example, the same or substantially the same as a temperature of the passenger space 102. However, in some implementations (for example, when no air conditioning system 208 is included in the vending system 200 or the air conditioning system 208 does not operate to maintain a particular temperature of the ambient temperature compartment 205), the ambient temperature compartment 205 can vary in temperature with the passenger space 102, i.e., no temperature control operations are performed with respect to compartment 205.

The illustrated vending system 200 also includes a control system 210 that is communicably coupled to the air conditioning system 208 and a user interface 206. The user interface 206 can include a display device, such as a 10" LCD screen, which can be turned on or off by a passenger and can show advertisements.

In some aspects, the control system 210 comprises a micro-processor based control system that includes one or more hardware processors and one or more tangible, non-transitory memory modules that stores executable instructions in the form of software. Thus, when executing the instructions, the control system 210 can perform operations to operate or control the air conditioning system 208 and the user interface 206, as well as transmit data/instructions 215 to and from the air conditioning system 208 and the user interface 206. Further, when executing the instructions, the control system 210 can perform operations to operate or control the enclosure 202 and/or one or more of the temperature-controlled compartments 201, 203, and 205 (e.g., provide access to through doors).

In this example implementation, the control system 210 also includes or is communicably coupled with an image recorder 214, such as a camera or video recorder. In some aspects, data in the form of images taken by the image recorder 214 can be taken in the passenger space 102 of the vehicle 100. Such data can be used by the control system 210 for further operations of, for example, the enclosure 202 and temperature-controlled compartments 201, 203, and 205.

In some aspects, the image recorder 214 can be used for video surveillance on the enclosure 202 (or other components of the vending system 200 or the vehicle 100, itself). For example, when the vending system 200 is installed within a fully autonomous robotaxi such as vehicle 100, or in a remote location where supervision does not exist, video surveillance can prevent or discourage theft of the vending products 204 (among other crimes). In some aspects, recorded images (still or video) can be sent (e.g., wirelessly by communication interface 218) to an office of an owner or operator of the vending system 200 so that in the event of vandalism, images and preferably a movie of the event can be captured and sent away from the vending system 200. In some aspects, images may only be captured by the image recorder 214 in the event of vandalism. A vandalism event may be determined by, for example, one or more sensors (that can be part of the control system 210 or image recorder 214) that monitor vibration, orientation angle, glass breakage, etc. The image recorder 214 (alone or in combination with other vandalism sensors) can act as a deterrent to vandals, who do not want a camera to capture their face or other distinguishing characteristics.

In some aspects, if there is attempted tampering with the enclosure 202, the vehicle 100 can be automatically directed (by autonomous driving control system 125) to, for example, a law enforcement station in order to register a complaint with the current passenger and even charge the passenger for the theft. Further, in some aspects, surveillance images taken by the image recorder 214 can be stored and later retrieved (through a network connection or from the recorder 214, itself, in the case of loss of connectivity).

In some aspects, as shown, the control system 210 includes a communication interface 218 that is operable to transmit data, information, images, requests, or other signals from the control system 210 (and thus the vehicle 100) to an remote (e.g., from the vehicle 100) computing system or data processing system. In some aspects, the communication interface 218 can communicate with the remote computing system or data processing system wirelessly, such as through cellular communications, Wi-Fi, Bluetooth, or other form of wireless communication. In some aspects, the communication interface 218 can communicate with the remote computing system or data processing system through a wired communication link.

In some aspects, the control system 210 can, e.g., constantly, be connected to the Internet (such as for surveillance and/or purchasing data). But occasionally inside tunnels and other times temporarily when the control system 210 loses an Internet connection, the control system 210 can store purchase information until the Internet connection is restored and transactions can continue seamlessly from the passenger's perspective.

The illustrated user interface 206, in some examples, comprises a communication device through which the one or more human passengers 110 interact with the control system 210 in order to select, procure, purchase, and retrieve one or more of the vending products 204 from the enclosure. For example, the user interface 206 can receive data from the one or more human passengers 110 in the form of product selection and quantity, as well as payment information, through one or more forms of transmission, such as manually (as a touchscreen or keyboard, for example), audibly (through a voice recognition interface), or electronically (such as wireless electronic communication with an application running on a mobile device of one of the human passengers 110). Further, in some aspects, the user interface 206 can provide data to the one or more human passengers 110 in the form of product selection and quantity confirmation, payment receipt, purchase history, etc., through one or more forms of transmission, such as visually (as a screen), audibly (through speakers), or electronically (such as wireless electronic communication with an application running on a mobile device of one of the human passengers 110).

In some aspects, the vending system 200 can also include a loudspeaker and/or microphone installed to allow for communication between an operator or owner of the vehicle 100 and the vehicle 100. This can provide additional security for the vending system 200, allowing an operator who has been alerted to tampering or a problem to communicate instructions to the passenger and from the passenger back to the operator.

In some aspects, and unlike a traditional vending machine that takes bills and coins, the vending system 200 (through control system 210) can link to a mobile phone app or accept digital payments (such as Google Pay/Apple Pay/NFC), which will handle virtual payments, thereby saving space for more items to sell and removing the threat of theft of physical money.

In some aspects, the vending system 200 can be associated with a mobile application that can give the most features for the passengers, allowing them to scroll through a menu of available items of the vending system 200 with up to date prices. The mobile application can also track loyalty points, store favorites, give passengers suggestions and promo codes, and alert passengers to specials, new items and promotions. In some aspects, a QRC code sticker on, e.g., the enclosure 202 can make it easy for new passengers to find the app and easily download it. When a passenger purchases a vending product 204 by removing it from the enclosure 202, the mobile application can update to communicate to the passenger what was purchased and can share that data with an operator of the vending system 200 so that the operator can know the passenger's purchasing history (if given permission by the passenger) for future predictive algorithms and inventory use.

In some aspects, the mobile application can attract riders to vehicles that include vending system 200. For example, the mobile application can be integrated with network applications that allow potential passengers to see which vehicles (e.g., in a fleet of robotaxis) have the vending system 200 and which ones do not have the vending system 200. The mobile application can also allow potential passengers to see which items are available in which vehicles and choose their ride accordingly. In this way, the mobile application can create a higher demand for vehicles that have the vending system 200 and could potentially allow for higher priced fares to be charged for the added service.

In some aspects, persons who may or may not be potential passengers can also interact with the vending system 200 to purchase one or more vending products 204. For example, the autonomous vehicle 100 can be moved to a particular location and vending system 200 can be utilized by persons external to the vehicle 100 to purchase one or more vending products 204. In some aspects, movement of the vehicle 100 to the particular location can be solely for the purpose of allowing outside persons (i.e., persons external to the vehicle 100 that are not passengers) to purchase one or more vending products 204.

In some aspects, the control system 210 can collect data about time of day, outside temperature, and other factors in order to adjust one or more prices of the vending products 204, thereby raising/lowering prices when appropriate. For example, if the outside temperature is hot, the control system 210 can raise prices of items such as cold beverages that could be in higher demand. In other words, prices for vending products 204 in the enclosure 202 can change depending on many factors, including time of day, specific passengers in the vehicle, location, weather, temperature, and length of trip. As another example, if it is raining, the price of rain ponchos or travel size umbrellas (e.g., stored in an ambient temperature compartment) may be raised. As another example, the control system 210 can operate a heating or cooking device (e.g., a microwave oven) within the enclosure 202 to warm hot or heated vending products 204 up to allow the vending system 200 to sell items like warm food or drinks on a cold day.

In some aspects, a cooking device such as a microwave oven can be provided, e.g., on top of the enclosure 202, that can be used by passengers to heat up specific items. A door to the microwave can only open, for example, if specific items are purchased. The microwave may only run for a set amount of time depending on the item purchased. Further, there can be a smoke detector in the microwave for safety, that can alert an operator or owner of the vehicle 100 if there is any sign of smoke and can shut off the microwave automatically.

As further shown in FIG. 2, the vending system 200 includes a power source 212 (e.g., one or more batteries or other independent power source). The power source 212 can supply, in this example: electric power 209 to the user interface 206, electric power 211 to the air conditioning system 208, and electric power 213 to the control system 210. In some aspects, the power source 212 can provide (and possibly generate) electrical power independently of any other power source and may, in some aspects, include one or more inverters or rectifiers (as well as other electrical components, such as disconnects, breakers, etc.). In some aspects, the power source 212 can also power one or more charging ports or outlets, e.g., for passengers to use (e.g., for a fee). In still further aspects, the power source 212 can also power a Wi-Fi hotspot in the vehicle 100, e.g., for passengers to use (e.g., for a fee).

In some aspects, as shown, the power source 212 is electrically coupled to the electrical power source 120, which provides electrical power 207 to the power source 212. In some aspects, therefore, the power source 212 comprises a throughput device (e.g., breaker, inverter, rectifier, disconnect, or a combination thereof) through which electrical power 207 is supplied to the other components of the vending system 200. In some aspects, the power source 212 can be charged (or re-charged) by the electrical power source 120 (with electrical power 207) in order to provide electrical power 209, 211, and 213 (and other power). In some aspects, a combination of electrical power 207 (from source 120) and electrical power from the power source 212 can be provided to the components of vending system 200.

Figure 3:
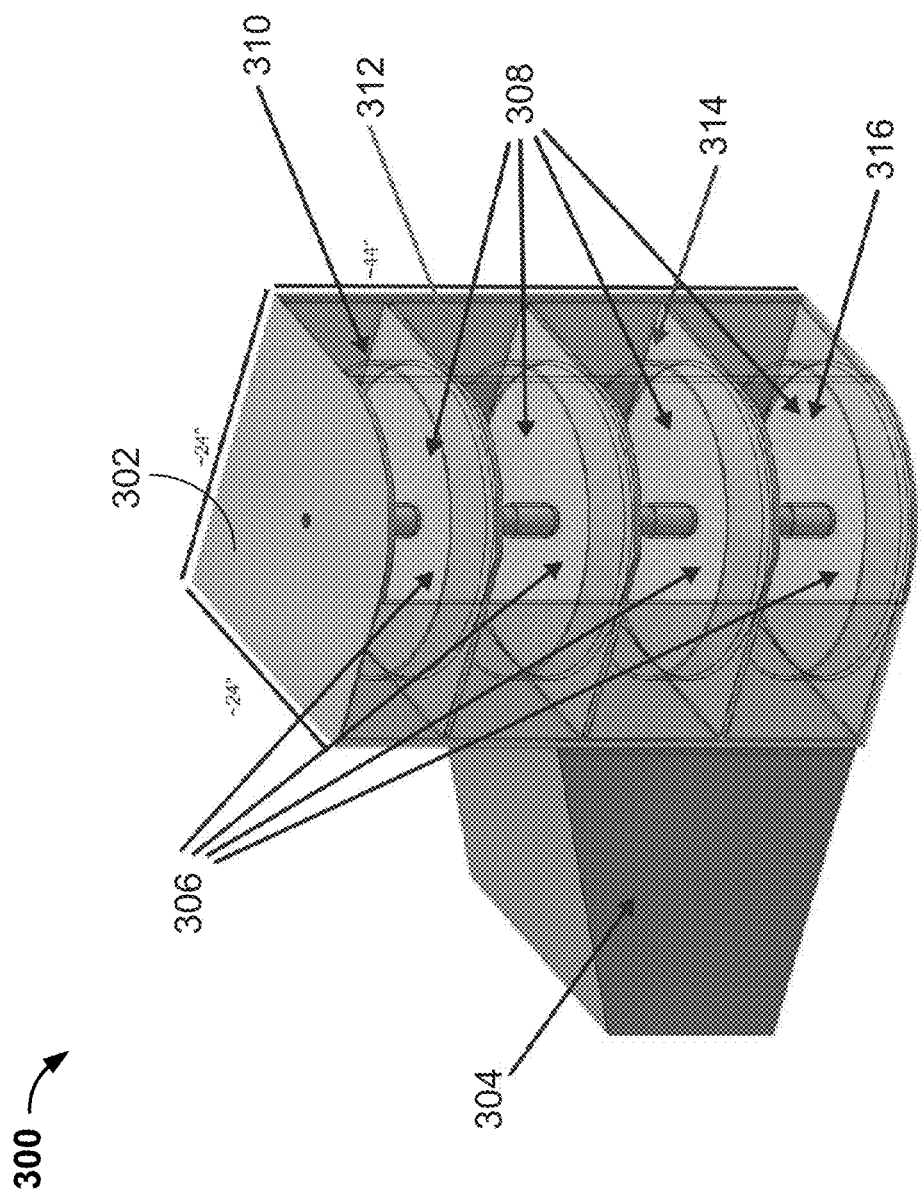
FIG. 3 is a schematic illustration of a portion of a vending system for a zero-emissions, autonomous vehicle according to the present disclosure.

FIG. 3 is a schematic illustration of a specific example implementation of a vending system sub-assembly ("sub-assembly") 300 for a zero-emissions, autonomous vehicle according to the present disclosure. In some aspects, the sub-assembly 300 can represent at least a portion of the vending system 200 shown in FIG. 2. In this specific implementation, the sub-assembly 300 includes an insulated enclosure 302, which is about 48 inches tall by 48 inches deep by 36 inches wide. The enclosure 302 has four clear, Lexan curved doors 308, so that customers (i.e., vehicle passengers) throughout a passenger compartment of the vehicle can see vending products for sale inside the enclosure 302 on five separate motorized, round shelves 306.

In this example, there are four levels (or tiers) for storing items in different temperature zones. Each level includes a round, rotating, segmented shelf 306 so that customers can easily see all the items for sale. In some aspects, the sub-assembly 300 can replace one of the vehicle's seats (and since there is no driver, essentially no volume for passengers has been lost).

In this example, the bottom two levels of the enclosure 302 include a freezer 316 to hold cold or frozen items (e.g., at the lowest level) such as ice cream. The second to lowest level can include a refrigerated section 314 to contain ice cold beverages such as beer, champagne and frozen alcoholic drinks such as canned mojitos and margaritas, as well as other non-alcoholic beverages. In some aspects, the refrigerated section 314 can be used by a passenger for a fee to store personal, refrigerated items. For example, a passenger that desires to keep, e.g., a baby bottle or drink refrigerated can operate the sub-assembly 300 (e.g., with the mobile application) to open the door 308 to section 314 at the beginning of their ride and re-open the door whenever they want to retrieve their item, for a fee.

The second from top compartment can include an ambient temperature section 312, which can hold food or non-food items at the temperature of the vehicle interior. The top compartment can include a heated section 310, which can hold hot, perishable items.

In some aspects, once a door 308 is open, the shelf 306 (or shelves 306) in that compartment stops rotating and passengers can select the vending product that was purchased (or that will be purchased). In some aspects, a passenger can scan a bar code on selected product, e.g., using the mobile application, which can debit the payment. In some aspects, an image recorder can be placed at the back of each level and facing the particular door 308. A control system (as part of a sub-system 304 that includes the control system and an air conditioning system) can determine which vending product (s) was selected and digitally debit the passenger's account. The door 308 can close on its own and re-lock after the passenger is done with the purchase, and the shelves 306 can begin spinning slowly again.

In some aspects of sub-assembly 300, when passengers enter the vehicle, a motion sensor on the sub-assembly 300 can turn on interior lights of the enclosure 302, start the shelves 306 rotating, turn on a digital sign and begin generating enticing smells. In this way, energy used by the sub-assembly 300 can be conserved when passengers are not in the vehicle.

In some aspects, to generate the enticing smells, a fan at the top of the enclosure 302 can turn on and one of several smell chambers can open to produce an enticing smell in the passenger volume of the vehicle. Which smell is chosen depends on a number of factors including demographic data from the customer, time of day, location, weather and length of trip. A smell that is determined to be the most appealing to the passenger can waft into the passenger volume, helping to entice passengers to purchase products for sale.

Figure 4A:
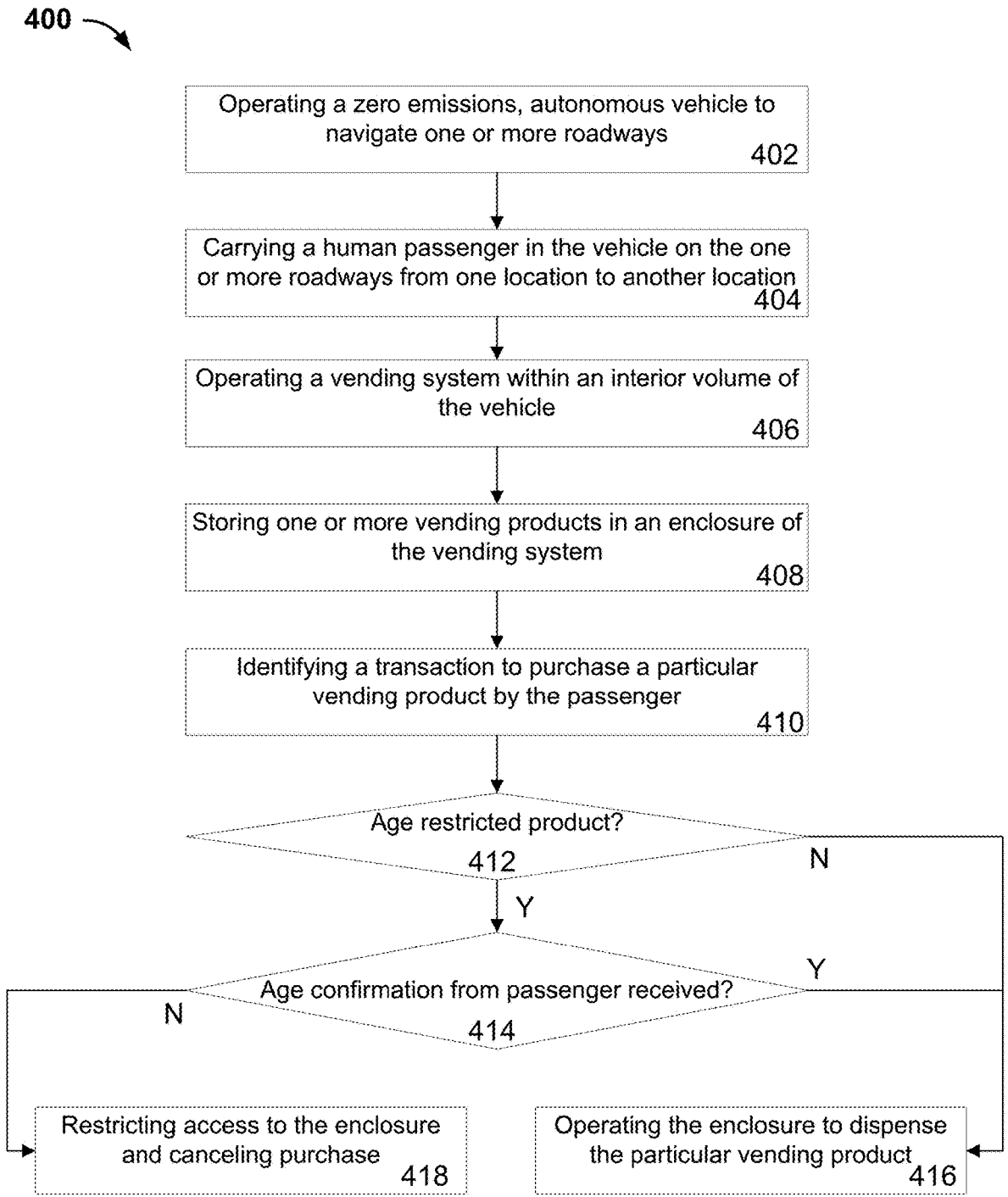
FIGS. 4A-4C are flowcharts that describe example processes performed with or by a vending system for a zero-emissions, autonomous vehicle according to the present disclosure.
Figure 4B:
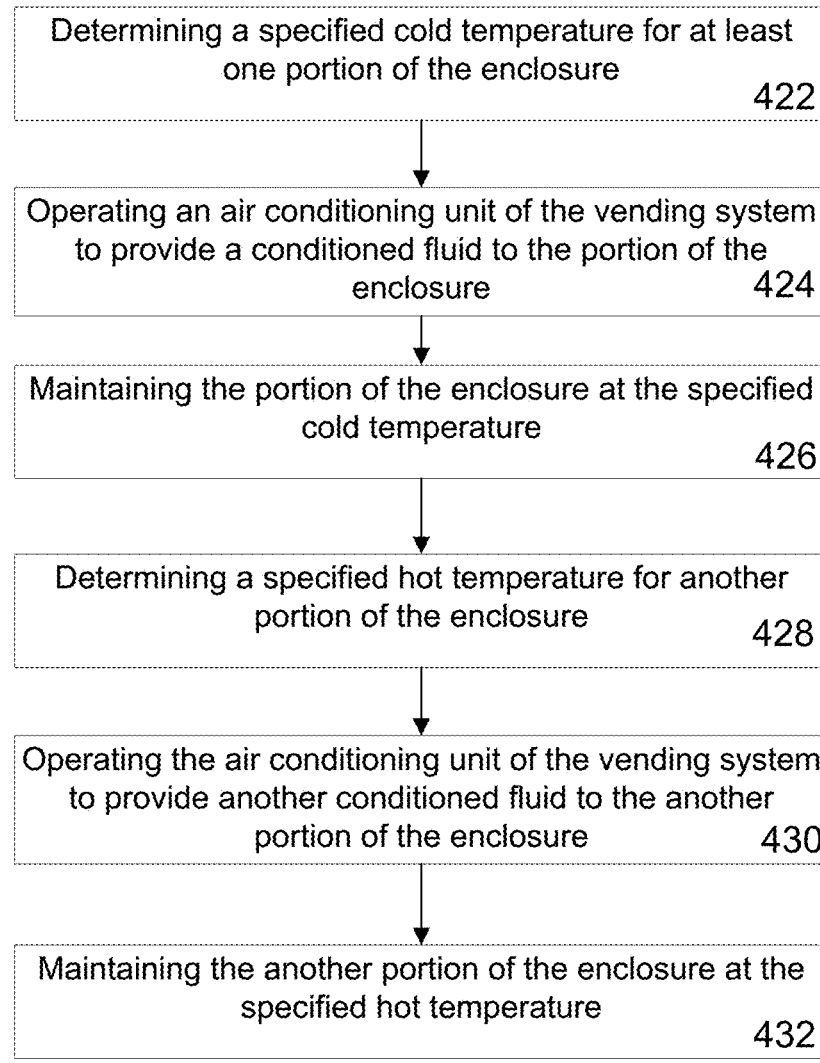
Figure 4C:
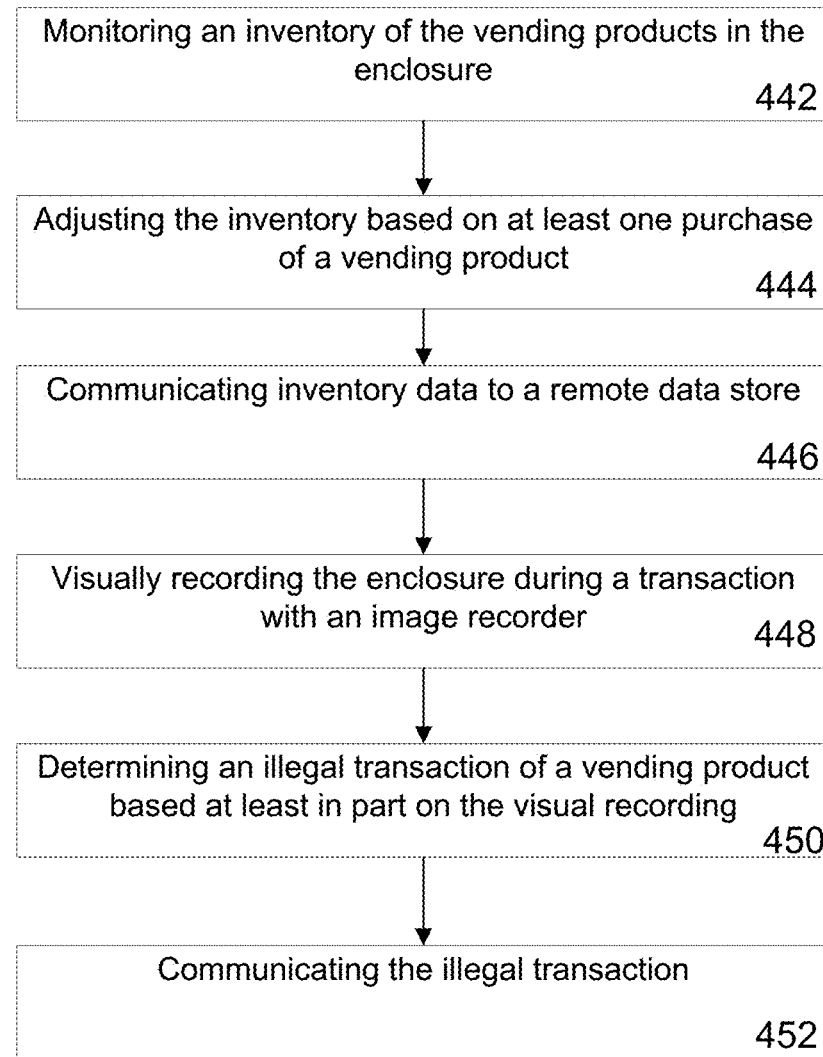

FIGS. 4A-4C are flowcharts that describe example processes 400, 420, and 440, respectively, performed with the vehicle zero-emissions, autonomous vehicle 100 and the vending system 200. For example, one or more steps of the processes can be performed by or with the control system 210 (as well as other components of the vending system 200).

Turning to FIG. 4A, process 400 can begin at step 402, which includes operating a zero emissions, autonomous vehicle to navigate one or more roadways. Process 400 can continue at step 404, which includes carrying a human passenger in the vehicle on the one or more roadways from one location to another location. Process 400 can continue at step 406, which includes operating a vending system within an interior volume of the vehicle (e.g., which can be powered by the electric battery of the vehicle). Process 400 can continue at step 408, which includes storing one or more vending products in an enclosure of the vending system (e.g., in one of perhaps several temperature-controlled compartments). Process 400 can continue at step 410, which includes identifying a transaction to purchase a particular vending product by the passenger (e.g., through a user interface of the vending system). Process 400 can continue at step 412, which includes determining whether the particular vending product is an age restricted product (e.g., alcohol or tobacco). If the determination in step 412 is yes, then process 400 can continue at step 414, which includes a determination of whether an age confirmation from the passenger has been received (e.g., by the passenger providing an identification with age verification through the user interface). If the determination in step 412 is no or if the determination in step 414 is yes, then process 400 can continue at step 416, which includes operating the enclosure to dispense the particular vending product (e.g., by opening or allowing access to the enclosure or providing the product to the passenger mechanically). If the determination in step 414 is no, then process 400 can continue at step 418, which includes restricting access to the enclosure and canceling purchase (e.g., by locking the enclosure and refunding the purchase amount).

Turning to FIG. 4B, process 420 can begin at step 422, which includes determining a specified cold temperature for at least one portion of the enclosure (e.g., a temperature-controlled cold or refrigerated compartment). Process 420 can continue at step 424, which includes operating an air conditioning unit of the vending system to provide a conditioned fluid to the portion of the enclosure (e.g., a cold airflow from a heat pump of the vending system). Process 420 can continue at step 426, which includes maintaining the portion of the enclosure at the specified cold temperature (e.g., by feedback to the air conditioning system from a thermostat or temperature sensor that controls operation of the air conditioning system). Process 420 can continue at step 428, which includes determining a specified hot temperature for another portion of the enclosure (e.g., a temperature-controlled heated compartment). Process 420 can continue at step 430, which includes operating the air conditioning unit of the vending system to provide another conditioned fluid to the another portion of the enclosure (e.g., a heated or hot airflow from the heat pump of the vending system). Process 420 can continue at step 432, which includes maintaining the another portion of the enclosure at the specified hot temperature (e.g., by feedback to the air conditioning system from the thermostat or temperature sensor that controls operation of the air conditioning system).

Turning to FIG. 4C, process 440 can begin at step 442, which includes monitoring an inventory of the vending products in the enclosure (e.g., by keeping track of purchases of each certain product type within the enclosure). For instance, instead of a traditional vending machine needing to have its inventory manually checked by a human and potentially running out of items, the vending system can have its inventory checked by a control system and transmit the inventory information to a remote computing system, e.g., at an operations center. When the inventory drops below a threshold, the vehicle can briefly stop at a conveniently located re-filling station to have the vending system re-filled. Process 440 can continue at step 444, which includes adjusting the inventory based on at least one purchase of a vending product (e.g., by updating inventory values for each product after each purchase). Process 440 can continue at step 446, which includes communicating inventory data to a remote data store (e.g., through a wireless communication from the vending system when the vehicle is in a wireless range). Process 440 can continue at step 448, which includes visually recording the enclosure during a transaction with an image recorder (e.g., to take images for security purposes). Process 440 can continue at step 450, which includes determining an illegal transaction of a vending product based at least in part on the visual recording (e.g., by using the images, in a machine learning system or otherwise, to detect theft of an unpaid for product). Process 440 can continue at step 452, which includes communicating the illegal transaction (e.g., to the passenger committing the theft, an owner or operator of the vehicle, and/or local law enforcement).

Figure 5:
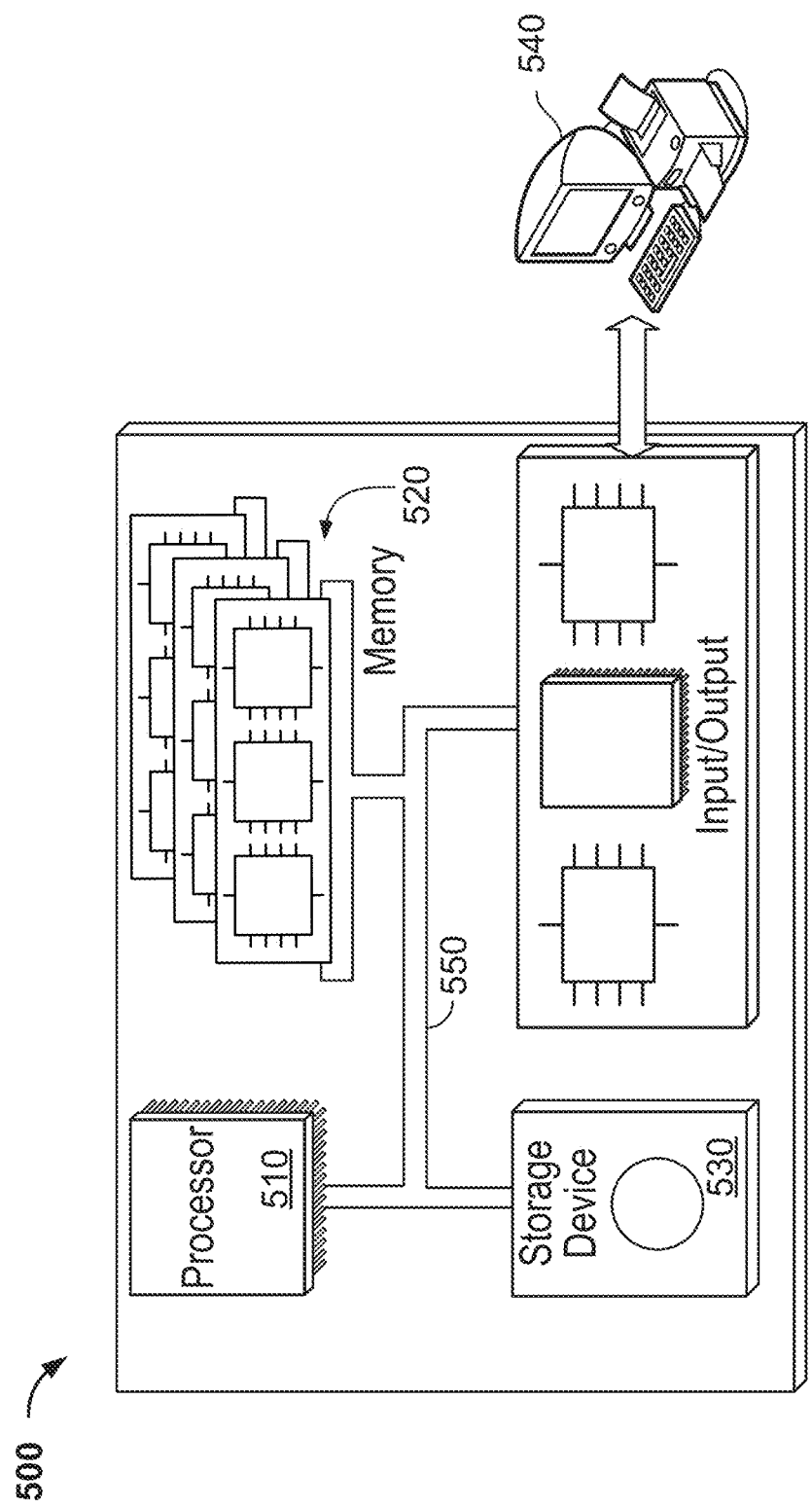
FIG. 5 is a schematic illustration of an example control system of a vending system of a zero emissions, autonomous vehicle according to the present disclosure.

FIG. 5 is a schematic illustration of an example control system 500 (or controller) for a vending system of a zero-emissions, autonomous vehicle, such as the vending system 200 of vehicle 100. For example, all or parts of the controller 500 can be used for the operations described previously, for example as or as part of the control system 210. The controller 500 is intended to include various forms of digital computers, such as printed circuit boards (PCB), processors, digital circuitry, or otherwise. Additionally, the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The controller 500 includes a processor 510, a memory 520, a storage device 530, and an input/output device 540 (which can be user interface 206). Each of the components 510, 520, 530, and 540 are interconnected using a system bus 550. The processor 510 is capable of processing instructions for execution within the controller 500. The processor may be designed using any of a number of architectures. For example, the processor 510 may be a CISC (Complex Instruction Set Computers) processor, a RISC (Reduced Instruction Set Computer) processor, or a MISC (Minimal Instruction Set Computer) processor.

In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the controller 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the controller 500. In one implementation, the storage device 530 is a computer-readable medium. In various different implementations, the storage device 530 may be a floppy disk device, a hard disk device, an optical disk device, a tape device, flash memory, a solid state device (SSD), or a combination thereof.

The input/output device 540 provides input/output operations for the controller 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, for example, in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, solid state drives (SSDs), and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) or LED (light-emitting diode) monitor for displaying information to the user and a keyboard and a pointing device such as a mouse or a trackball by which the user can provide input to the computer. Additionally, such activities can be implemented via touchscreen flat-panel displays and other appropriate mechanisms.

The features can be implemented in a control system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

A number of implementations have been described. Nevertheless, it will be understood that various modifications may be made without departing from the spirit and scope of the disclosure. For example, example operations, methods, or processes described herein may include more steps or fewer steps than those described. Further, the steps in such example operations, methods, or processes may be performed in different successions than that described or illustrated in the figures. Accordingly, other implementations are within the scope of the following claims.

What is claimed is:

1. A zero emissions, autonomous vehicle system, comprising:
   a zero emissions, autonomous vehicle configured to navigate one or more roadways independently of a human driver, the zero emissions, autonomous vehicle comprising at least one electrical power source that comprises an electric vehicle (EV) traction battery that is electrically coupled to an electric motor of the zero emissions, autonomous vehicle that is configured to supply motive power to one or more wheels of the zero emissions, autonomous vehicle based on a supply of electric power from the at least one electrical power source to the electric motor;
   a passenger compartment defined within an interior volume of the zero emissions, autonomous vehicle and configured to support one or more human passengers during the navigation of the one or more roadways independently of the human driver;
   a vending system mounted at least partially in the interior volume of the zero emissions, autonomous vehicle and electrically coupled to the at least one electrical power source and configured to; receive an effective continuous supply of electrical power from the EV traction battery of the at least one electrical power source simultaneously with the at least one electrical power source supplying electrical power to the electric motor to generate the motive power, and receive the effective continuous supply of electrical power from the at least one electrical power source when the zero emissions, autonomous vehicle is off, the vending system comprising:
      an accessible enclosure, comprising:
         a first temperature-controlled compartment comprising a first door configured to allow access to the first temperature-controlled compartment from the passenger compartment, the first temperature-controlled compartment configured to maintain one or more first vending products at a first temperature that is at or below a freezing temperature and is cooler than an ambient temperature within the passenger compartment, a second temperature-controlled compartment comprising a second door configured to allow access to the second temperature-controlled compartment from the passenger compartment, the second temperature-controlled compartment configured to maintain one or more second vending products at a second temperature that is at a refrigerated temperature above the freezing temperature and cooler than the ambient temperature within the passenger compartment, and a third temperature-controlled compartment comprising a third door configured to allow access to the third temperature-controlled compartment from the passenger compartment, the third temperature-controlled compartment configured to maintain one or more third vending products at a third temperature at or above the ambient temperature within the passenger compartment; and a control system including a user interface, the control system configured to operate the accessible enclosure to provide human access to the first, second, and third temperature-controlled compartments through the respective first, second, and third doors based on one or more human interactions with the user interface; and an internal power source electrically coupled to the vending system to provide the effective continuous supply of electrical power to the vending system independent from the EV traction battery of the at least one electrical power source supplying electrical power to the electric motor to generate the motive power and independent from the EV traction battery of the at least one electrical power source supplying the effective continuous supply of electrical power to the vending system.

2. The zero emissions, autonomous vehicle system of claim 1, wherein the vending system further comprises an air conditioning unit communicably coupled to the control system and configured to maintain the first and second temperature-controlled compartments at the first and second specified temperatures, respectively.

3. The zero emissions, autonomous vehicle system of claim 1, wherein the air conditioning unit is configured to maintain the first temperature-controlled compartment at the first temperature and to maintain the second temperature-controlled compartment at the second temperature higher than the first temperature.

4. The zero emissions, autonomous vehicle system of claim 3, wherein the air conditioning unit is configured to maintain the third temperature-controlled compartment at the third temperature.

5. The zero emissions, autonomous vehicle system of claim 4, wherein the accessible enclosure comprises an insulated accessible enclosure.

6. The zero emissions, autonomous vehicle system of claim 3, wherein the first temperature-controlled compartment comprises a freezer compartment and the second temperature-controlled compartment comprises a refrigerated compartment.

7. The zero emissions, autonomous vehicle system of claim 1, wherein the control system is configured to perform operations comprising:
identifying a human interaction of the one or more human passengers with the user interface to select at least one of the first, second, or third vending products;
identifying another human interaction of the one or more human passengers with the user interface to provide payment for the selected at least one of the first, second, or third vending products; and
operating at least one of the first, second, or third doors of the accessible enclosure to open the associated first, second, or third temperature-controlled compartment to provide access for the selected at least one of the first, second, or third vending products to the one or more human passengers.

8. The zero emissions, autonomous vehicle system of claim 7, wherein the control system is configured to perform operations comprising:
visually identifying removal of the selected at least one of the first, second, or third vending products from the open associated first, second, or third temperature-controlled compartment by the one or more human passengers;
visually identifying removal of an unpaid-for vending product in addition to the selected at least one of the first, second, or third vending products from the open associated first, second, or third temperature-controlled compartment by the one or more human passengers; and
notifying at least one of the one or more human passengers, an owner or operator of the vehicle, or a law enforcement system.

9. The zero emissions, autonomous vehicle system of claim 7, wherein identifying the human interaction of the one or more human passengers with the user interface comprises identifying a communication between a mobile device of the one or more human passengers and the user interface to select at least one of the first, second, or third vending products.

10. The zero emissions, autonomous vehicle system of claim 7, wherein the control system is configured to perform operations comprising:
determining, prior to operating the accessible enclosure to open the associated first, second, or third temperature-controlled compartment, that the selected at least one of the first, second, or third vending products is an age-restricted vending product;
requesting, via the user interface, age confirmation from the one or more human passengers;
determining that the age confirmation meets or exceeds the age restriction; and
subsequent to the determination, operating the accessible enclosure to open the associated first, second, or third temperature-controlled compartment to provide access for the selected at least one of the first, second, or third vending products to the one or more human passengers.

11. The zero emissions, autonomous vehicle system of claim 10, wherein the control system is configured to perform operations comprising:
determining that the age confirmation does not meet or exceed the age restriction; and
subsequent to the determination, locking the associated first, second, or third temperature-controlled compartment to prevent access to the selected at least one of the first, second, or third vending products to the one or more human passengers.

12. The zero emissions, autonomous vehicle system of claim 1, wherein the control system is configured to perform operations comprising:
monitoring an inventory of the one or more first, second, or third vending products; and
based on a dispensing of at least one of the one or more first, second, or third vending products to the one or more human passengers, adjusting the inventory of the one or more first, second, or third vending products.

13. The zero emissions, autonomous vehicle system of claim 1, wherein the control system is configured to perform operations comprising:
   storing payment transaction data and inventory data of the one or more first, second, or third vending products; and
   intermittently communicating the stored payment transaction data and inventory data wirelessly to a remote data store.

14. The zero emissions, autonomous vehicle system of claim 1, wherein the zero emissions, autonomous vehicle comprises a for-hire vehicle.

15. The zero emissions, autonomous vehicle system of claim 1, wherein the internal power source comprises a 1 kWh battery.

16. A method, comprising:
   operating a zero emissions, autonomous vehicle to navigate one or more roadways independently of a human driver, the zero emissions, autonomous vehicle comprising at least one electrical power source that comprises an electric vehicle (EV) traction battery electrically coupled to a motor of the zero emissions, autonomous vehicle and an internal power source independent from the EV traction battery;
   supplying motive power to one or more wheels of the zero emissions, autonomous vehicle from the electric motor based on a supply of electric power from the at least one electrical power source to the electric motor;
   carrying one or more human passengers during the navigation of the one or more roadways independently of the human driver in a passenger compartment defined within an interior volume of the zero emissions, autonomous vehicle;
   operating a vending system mounted at least partially in the interior volume of the zero emissions, autonomous vehicle and electrically coupled to the at least one electrical power source, wherein the operating comprises:
      while supplying motive power to the one or more wheels of the zero emissions, autonomous vehicle from the electric motor based on the supply of electric power from the at least one electrical power source to the electric motor, supplying an effective continuous supply of electrical power from the EV traction battery of the at least one electrical power source to the vending system to operate the vending system;
      while the zero emissions, autonomous vehicle is off, supplying the effective continuous supply of electrical power from the at least one electrical power source to the vending system to operate the vending system;
      storing one or more vending products in an accessible enclosure adjacent the one or more human passengers, the storing comprising:
         storing one or more first vending products at a first temperature that is at or below a freezing temperature and is cooler than an ambient temperature within the passenger compartment in a first temperature-controlled compartment of the accessible enclosure, the first temperature-controlled compartment comprising a first door configured to allow access to the first temperature-controlled compartment from the passenger compartment,
         storing one or more second vending products at a second temperature that is at a refrigerated temperature above the freezing temperature and cooler than the ambient temperature within the passenger compartment in a second temperature-controlled compartment of the accessible enclosure, the second temperature-controlled compartment comprising a second door configured to allow access to the second temperature-controlled compartment from the passenger compartment, and
         storing one or more third vending products at a third temperature at or above the ambient temperature within the passenger compartment in a third temperature-controlled compartment of the accessible enclosure, the third temperature-controlled compartment comprising a third door configured to allow access to the third temperature-controlled compartment from the passenger compartment; and
      operating the accessible enclosure to provide human access to at least one of the first, second, or third temperature-controlled compartment based on one or more human interactions with a user interface of a control system of the vending system.

17. The method of claim 16, further comprising maintaining at least one of the first, second, or third temperature-controlled compartment at a specified temperature with an air conditioning unit communicably coupled to the control system of the vending system.

18. The method of claim 17, further comprising:
   maintaining, with the air conditioning unit, the first temperature-controlled compartment at the first temperature;
   maintaining, with the air conditioning unit, the second temperature-controlled compartment at the second temperature; and
   maintaining, with the air conditioning unit, the third temperature-controlled compartment at the third temperature.

19. The method of claim 18, further comprising operating, with the control system, the first, second, or third door for each of the respective first, second, and third temperature-controlled compartments.

20. The method of claim 18, wherein the first temperature-controlled compartment comprises a freezer compartment, and the second temperature-controlled compartment comprises a refrigerated compartment.

21. The method of claim 16, further comprising:
   identifying, with the control system, a human interaction of the one or more human passengers with the user interface to select at least one of the first, second, or third vending products;
   identifying, with the control system, another human interaction of the one or more human passengers with the user interface to provide payment for the selected vending product; and
   operating, with the control system, the accessible enclosure to open at least one of the first, second, or third temperature-controlled compartments to provide access for the selected vending product to the one or more human passengers.

22. The method of claim 21, further comprising:
   visually identifying, with the control system, removal of the selected vending product from the open at least one of the first, second, or third temperature-controlled compartments by the one or more human passengers;

visually identifying, with the control system, removal of an unpaid for vending product in addition to the selected vending product from the open at least one of the first, second, or third temperature-controlled compartments by the one or more human passengers; and
notifying, with the control system, at least one of the one or more human passengers, an owner or operator of the vehicle, or a law enforcement system.

23. The method of claim 21, wherein identifying the human interaction of the one or more human passengers with the user interface comprises identifying, with the control system, a communication between a mobile device of the one or more human passengers and the user interface to select at least one of the vending products.

24. The method of claim 21, further comprising:
determining, with the control system and prior to operating the accessible enclosure to open the at least one of the first, second, or third temperature-controlled compartments, that the selected vending product is an age-restricted vending product;
requesting, with the control system and via the user interface, age confirmation from the one or more human passengers;
determining, with the control system, that the age confirmation meets or exceeds the age restriction; and
subsequent to the determination, operating, with the control system, the accessible enclosure to open the at least one of the first, second, or third temperature-controlled compartments to provide access for the selected at least one of the first, second, or third vending products to the one or more human passengers.

25. The method of claim 16, further comprising:
monitoring, with the control system, an inventory of the one or more first, second, or third vending products; and
based on a dispensing of at least one of the one or more vending products to the one or more human passengers, adjusting, with the control system, the inventory of the one or more first, second, or third vending products.

26. The method of claim 16, further comprising:
storing, with the control system, payment transaction data and inventory data of the one or more first, second, or third vending products; and
intermittently communicating, with the control system, the stored payment transaction data and inventory data wirelessly to a remote data store.

27. A vending system for a zero emissions, autonomous vehicle configured to navigate one or more roadways independently of a human driver with at least one electrical power source that comprises an electric vehicle (EV) traction batter that is electrically coupled to an electric motor of the zero emissions, autonomous vehicle and an internal power source independent from the EV traction battery, the zero emissions, autonomous vehicle comprising a passenger compartment defined within an interior volume of the zero emissions, autonomous vehicle and configured to support one or more human passengers during the navigation of the one or more roadways independently of the human driver, the vending system comprising;
an accessible enclosure that comprises at least three temperature-controlled compartments, each of the at least three temperature-controlled compartments comprising an independent access door configured to allow access to the particular temperature-controlled compartment from the interior volume, each of the at least three temperature-controlled compartments maintained at a unique temperature different than the others of the at least three temperature-controlled compartments, the unique temperatures comprising a first specified temperature at or less than a freezing temperature, a second specified temperature at a refrigeration temperature, and a third specified temperature at an ambient temperature within the interior volume; and
a control system electrically coupled to the at least one electrical power source and comprising a user interface, the control system configured to operate the accessible enclosure to provide human access to the at least three temperature-controlled compartments based on one or more human interactions with the user interface, wherein
the electric motor is configured to supply motive power to one or more wheels of the zero emissions, autonomous vehicle based on a supply of electric power from the at least one electrical power source to the electric motor,
the vending system is configured to receive an effective continuous supply of electrical power from the EV traction battery of the at least one electrical power source simultaneously with the at least one electrical power source supplying electrical power to the electric motor to generate the motive power, and
the vending system is configured to receive the effective continuous supply of electrical power from the at least one electrical power source when the zero emissions, autonomous vehicle is off.

28. The vending system of claim 27, further comprising an air conditioning unit communicably coupled to the control system and configured to maintain the at least three temperature-controlled compartments at the respective unique temperature.

29. The vending system of claim 27, wherein the at least three temperature-controlled compartments comprise a first temperature-controlled compartment, a second temperature-controlled compartment, and a third temperature controlled compartment, and the air conditioning unit is configured to:
maintain the first temperature-controlled compartment at the first specified temperature,
maintain the second temperature-controlled compartment at the second specified temperature higher than the first specified temperature, and
maintain the third temperature-controlled compartment at the ambient temperature substantially equal to a temperature of the interior volume of the zero emissions, autonomous vehicle.

30. The vending system of claim 27, wherein the control system is configured to perform operations comprising:
identifying a human interaction of the one or more human passengers with the user interface to select at least one of the vending products;
identifying another human interaction of the one or more human passengers with the user interface to provide payment for the selected at least one of the vending products; and
operating the accessible enclosure to open one of the at least three temperature-controlled compartments to provide access for the selected at least one of the vending products to the one or more human passengers.

31. The vending system of claim 30, wherein the control system is configured to perform operations comprising:
visually identifying removal of the selected at least one of the vending products from the open temperature-controlled compartment by the one or more human passengers;
visually identifying removal of an unpaid for vending product in addition to the selected at least one of the vending products from the open temperature-controlled compartment by the one or more human passengers; and notifying at least one of the one or more human passengers, an owner or operator of the vehicle, or a law enforcement system.

32. The vending system of claim 30, wherein identifying the human interaction of the one or more human passengers with the user interface comprises identifying a communication between a mobile device of the one or more human passengers and the user interface to select at least one of the vending products, and identifying another human interaction of the one or more human passengers with the user interface comprises identifying another communication between the mobile device of the one or more human passengers to provide payment for the selected at least one of the vending products.

33. The vending system of claim 32, wherein the control system is configured to perform operations comprising:

providing a notification of at least one of the selected at least one of the vending products or payment for the selected at least one of the vending products on the user interface.

34. The vending system of claim 32, wherein the control system is configured to perform operations comprising:

providing a notification of at least one of the selected at least one of the vending products or payment for the selected at least one of the vending products to the mobile device.

35. The vending system of claim 27, wherein the one or more vending products comprises a solid or liquid food product, and at least one of the solid or liquid food product comprises a perishable food product.

* * * * *